United States Patent

Dudzik

Patent Number: 5,375,964
Date of Patent: Dec. 27, 1994

[54] ARM ROBOT APPARATUS

[76] Inventor: Krzysztof Dudzik, Gartenweg 1, CH-8755 Ennenda, Switzerland

[21] Appl. No.: 19,437

[22] Filed: Feb. 18, 1993

[30] Foreign Application Priority Data

Feb. 18, 1992 [CH] Switzerland ............ 00475/92
Jul. 30, 1992 [CH] Switzerland ............ 02425/92

[51] Int. Cl.$^5$ .................................................. B66C 23/00
[52] U.S. Cl. ............................ 414/744.3; 74/99 A; 384/43; 901/19
[58] Field of Search ............ 414/744.3, 744.5, 749, 414/751, 756, 753, 729, 744.1; 901/15, 25, 40, 19; 74/99 A, 99 R, 459, 465, 479 B; 384/43

[56] References Cited

U.S. PATENT DOCUMENTS

| | | |
|---|---|---|
| 2,890,594 | 6/1959 | Galonska . |
| 4,738,415 | 4/1988 | Weyer . |
| 4,872,903 | 10/1989 | Periou ............ 74/459 X |
| 5,017,083 | 5/1991 | Sahlin ............ 414/744.3 |
| 5,228,353 | 7/1993 | Katahira et al. ...... 74/459 X |

FOREIGN PATENT DOCUMENTS

| | | |
|---|---|---|
| 0292056 | 11/1988 | European Pat. Off. . |
| 1301396 | 12/1962 | France . |
| 2040142 | 1/1971 | France . |
| 2339324 | 2/1975 | Germany . |
| 932721 | 7/1963 | United Kingdom . |

Primary Examiner—Donald W. Underwood
Attorney, Agent, or Firm—Burns, Doane, Swecker & Mathis

[57] ABSTRACT

An arm robot apparatus for removing workpieces such as injected molded articles includes a gripping device mounted on an arm and a race member mounted on the arm for circulating balls. The race member includes an inner part and an outer part. A ball race spindle is located inside the race member and extends along a longitudinal axis of the race member. A mounting block which is mounted on a supporting plate is attached to a first end of the ball race spindle. A second end of the ball race spindle has at least two semicircular ball races formed therein. The inner part and the outer part of the race members are interconnected in such a way that ball races of a circular cross-section are formed. The ball races are designed in such a manner that the balls arranged in the races contact the inner part and the outer part of the race member. The inner part of the race member also includes pre-tensioning channels in which balls are received for displacement and movement. The pre-tensioning channels are shaped in such a way that the balls contact the inner part and the ball race spindle. Further, the pre-tensioning channels are interconnected in a sine wave fashion and are alternatingly arranged around the race member. The balls are displaceable and moveable through the ball races and through the pretensioning channels around the ball race spindle. The race member is mounted to a movable plate so that movement of the movable plate causes the race member to rotate around the ball race spindle.

13 Claims, 7 Drawing Sheets

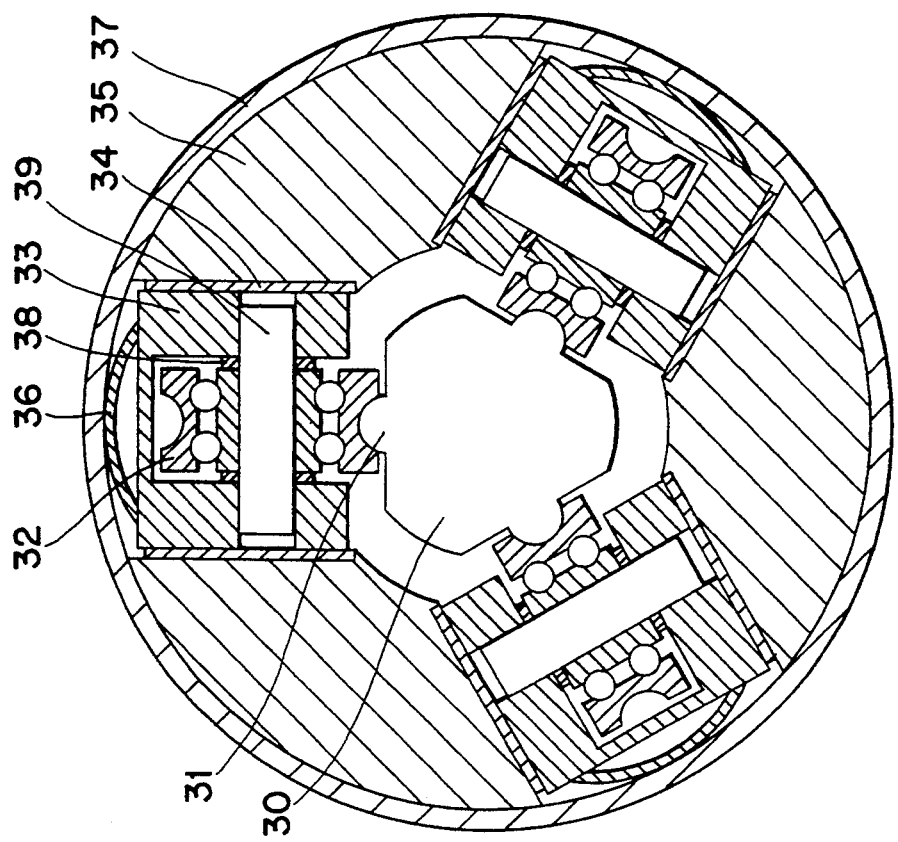
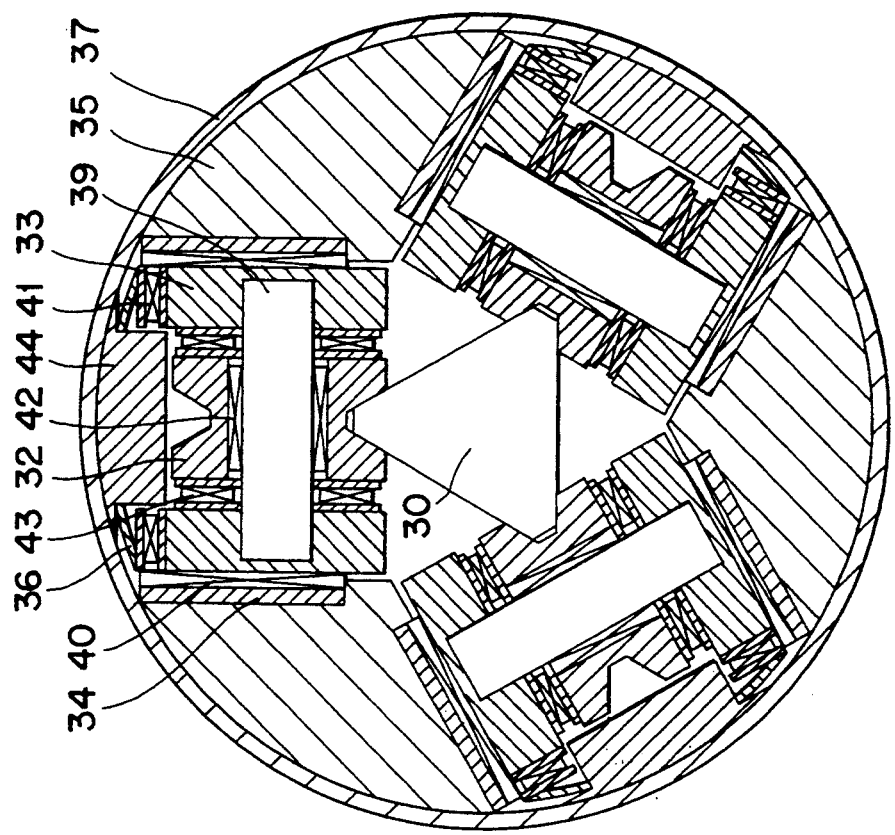

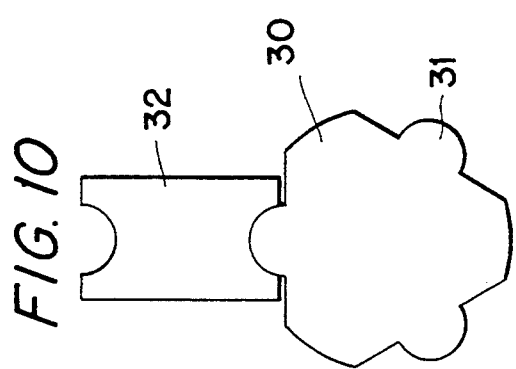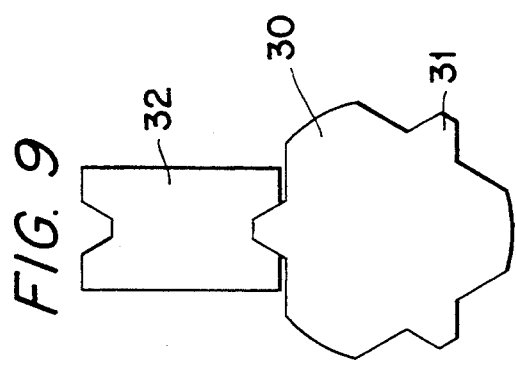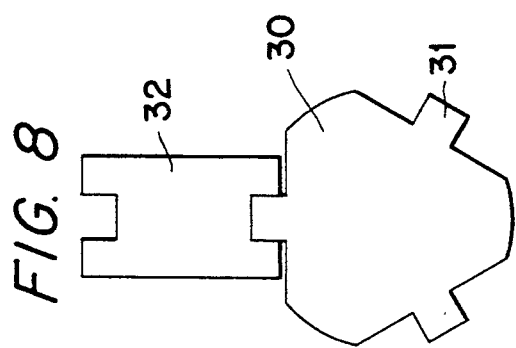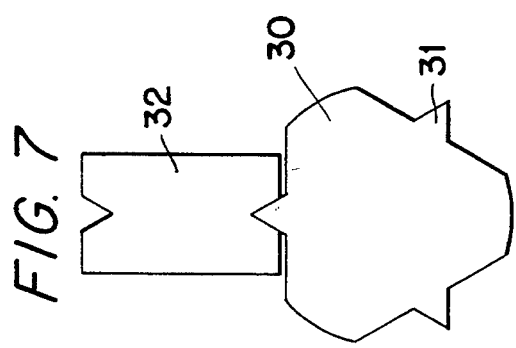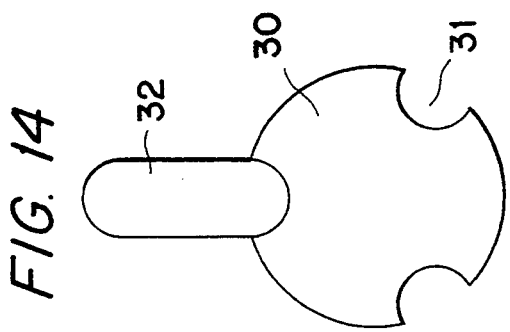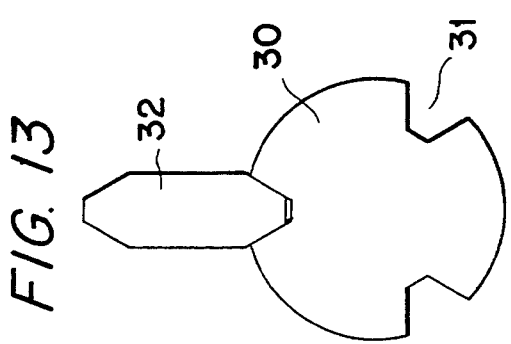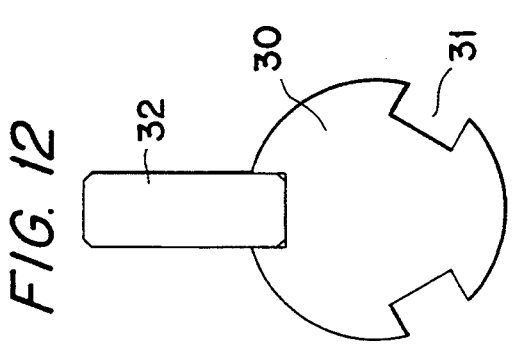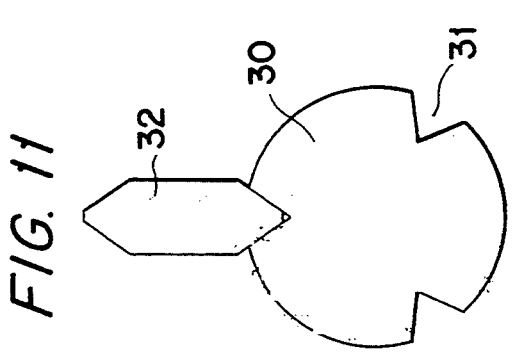

ARM ROBOT APPARATUS

BACKGROUND OF THE INVENTION

1. Field Of the Invention

The present invention relates to an arm robot apparatus, and more particularly to an arm robot apparatus for removing workpieces, such as injection molded articles.

2. Description of the Prior Art

A large variety of arm robots are known in the prior art.

There are only a few robots having a positive mechanical control, for instance by means of gear wheels or toothed belts.

These robots have the drawback of being prone to malfunctions and of not always operating in a precise manner. Hydraulically controlled robots operate slow and not always in a precise manner.

A positive control by means of balls or by roller bearings is not known.

SUMMARY OF THE INVENTION

It is an object of the invention to provide a new robot which is positively controlled by balls or roller bearings and which operates reliably, precisely and speedily.

A further object is to provide an arm robot apparatus, specifically for the removal of workpieces, such as injection molded articles, comprising an arm and a gripping device mounted to said arm;
a race member for circulating balls, which race member is mounted to said arm and includes an inner part and an outer part;
a ball race spindle located inside of said outer race member and extending along its longitudinal axis, said ball race spindle having a first and a second end;
a mounting block mounted to the first end of said ball race spindle and to a supporting plate;
the second end of said ball race spindle includes two to six, and preferably three semicircular ball races formed thereinto;
the inner part and the outer part of the race member for circulating balls are interconnected in such a manner that ball races of a circular cross-section are located there-between and have balls arranged therein which are adapted to be displaced and moved;
the ball races are designed in such a manner that the balls contact the inner part and the outer part of the race member;
the inner part of said race member for circulating balls includes pre-tensioning channels in which balls are received to be displaced and moved;
the pre-tensioning channels are shaped in such a manner that the balls contact said inner part and said ball race spindle;
and the pre-tensioning channels are interconnected in a sine wave fashion and are arranged alternatingly around said race member;
the balls are displaceable and moveable through the ball races and through the pre-tensioning channels around the ball race spindle;
the race member for circulating balls is mounted to a bearing ring;
the bearing ring is located between an inner axial bearing and an outer axial bearing, between which bearings a radial bearing is located;
the bearings are mounted on a driving tube and the axial beatings are pre-tensioned by a nut;
the driving tube is mounted to a mounting block which in turn is mounted to a moveable plate.

Still a further object is to provide an arm robot apparatus, specifically for the removal of workpieces, such as injection molded articles, comprising an arm and a gripping device mounted to said arm;
said arm is mounted to at least one roller bearing nut;
a roller spindle is located inside said roller bearing nut extending in the longitudinal direction thereof;
the roller spindle has a first end and a second end and the first end is mounted to a mounting block;
the mounting block is mounted to a supporting plate;
the second end of the roller spindle includes two to six ball races set thereupon, and/or set thereinto and/or are arranged planarly;
the spindle contacts supported roller bodies which are mounted in guiding bearings or directly into a housing, the guiding bearings are set in bushings or in needle roller bearings, the bushings and the needle roller bearings are mounted in a housing, the guiding bearings are pre-tensioned by a cup spring which is arrested by an arresting ring;
a spacer disc is located at two inner sides of the supported rollers;
the supported rollers are connected together with the spacer disc to a peg;
the race member is mounted to a bearing ring on which an inner axial bearing and an outer axial bearing are located, between which bearings a radial bearing is located, the bearings are mounted on a driving tube and the axial bearings are pre-tensioned by a nut;
the driving tube is mounted to a mounting block which in turn is mounted to a moveable plate.

BRIEF DESCRIPTION OF THE DRAWINGS

The invention will be better understood and objects other than those set forth above will become apparent when consideration is given to the following detailed description thereof.

Such description makes reference to the annexed drawings wherein:

FIGS. 4 and 5 illustrate cross sections of possible designs of a second embodiment of the inventive apparatus;

FIGS. 7 to 10 illustrate possible cross sections through the spindle having ball races set thereupon;

FIGS. 11 to 14 illustrate cross sections through the spindle with ball races set recessed thereinto;

DESCRIPTION OF THE PREFERRED EMBODIMENTS

The arm robot includes an arm 1 and a gripping device 2 that is connected to the arm 1. The arm 1 and the gripping device 2 are known to the person skilled in the art and can be designed in accordance with respective demands.

Figure 1:
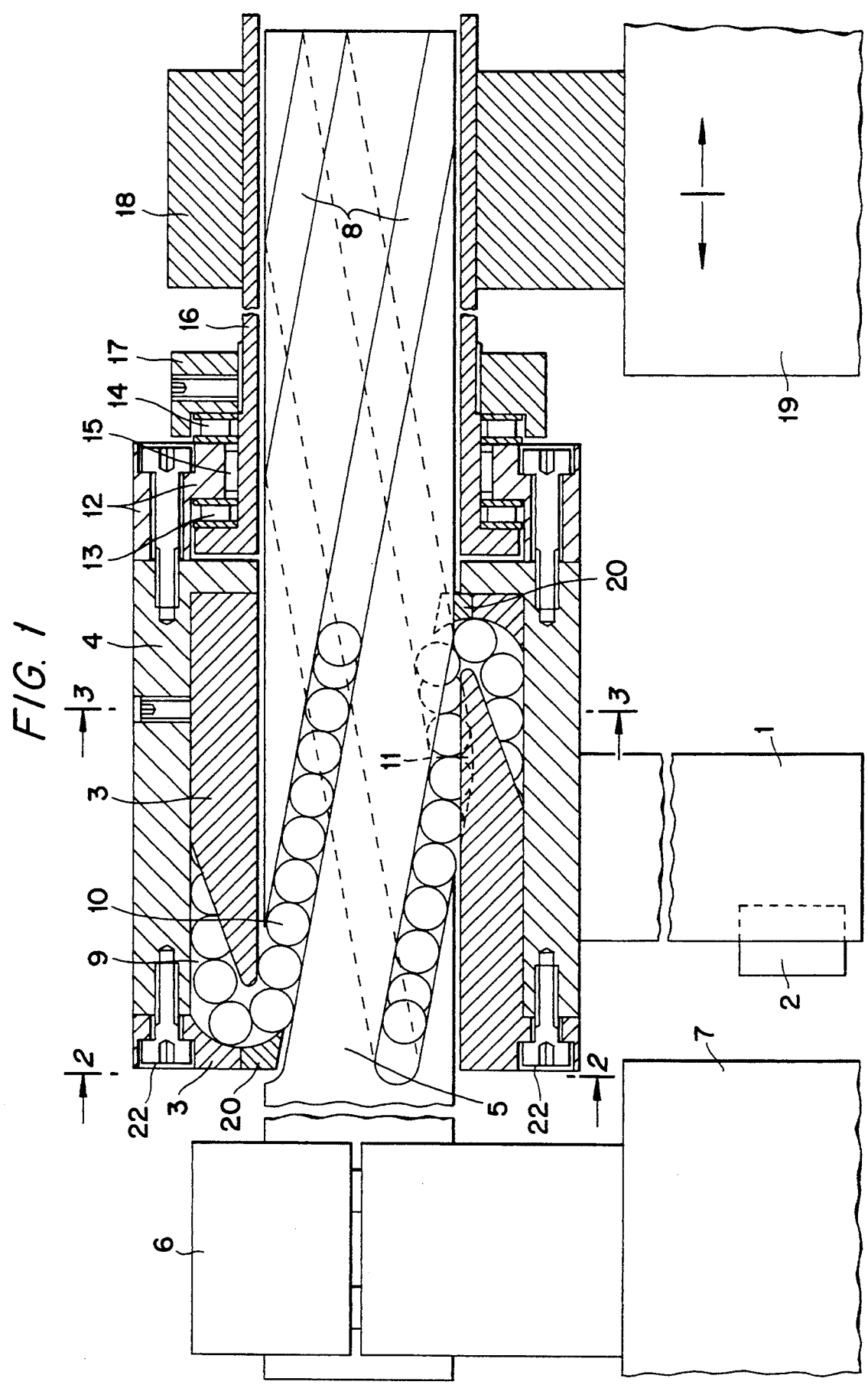
FIG. 1 is a cross section along a longitudinal axis through a first embodiment of the inventive apparatus.
Figure 3:
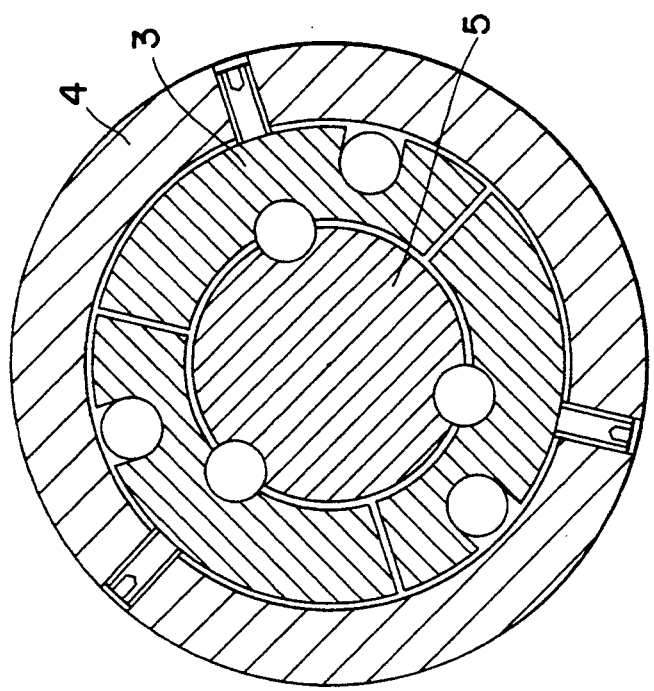
FIG. 3 is a section along the section line 3—3 in FIG. 1.
Figure 2:
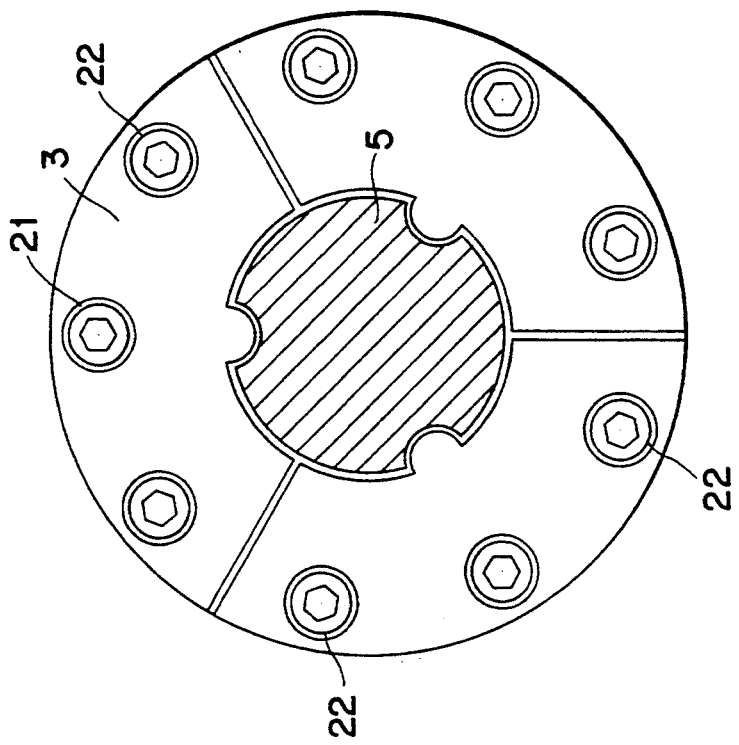
FIG. 2 is a section along the section line 2—2 in FIG. 1.
Figure 6:
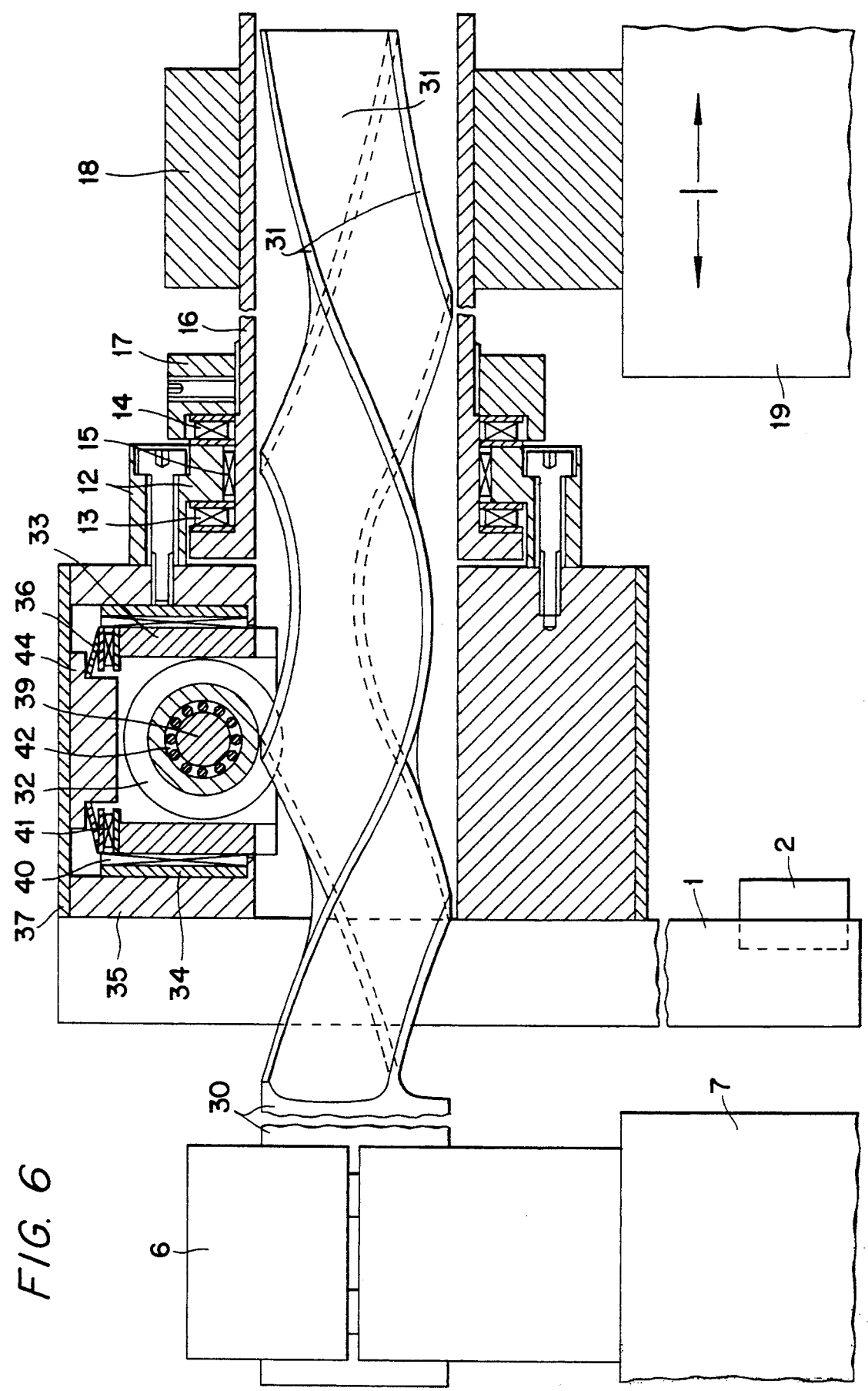
FIG. 6 illustrates a cross section along the longitudinal axis through a possible design of the second embodiment of the inventive device and possible arrangements of ball races set onto the spindle and of the planar ball races.
Figure 17:
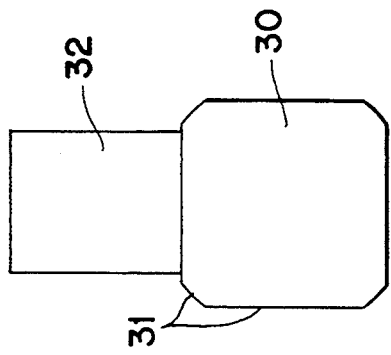
FIGS. 15 to 20 illustrate cross sections through the spindle with planar ball races.
Figure 20:
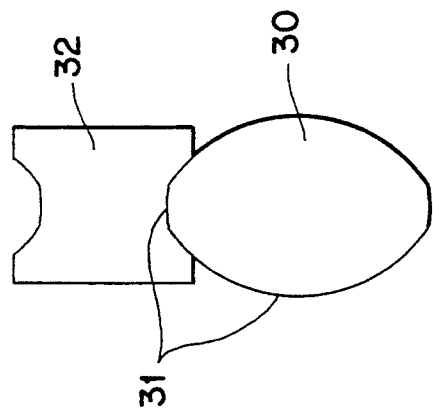
Figure 16:
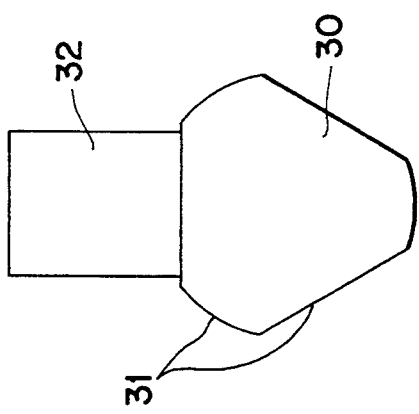
Figure 19:
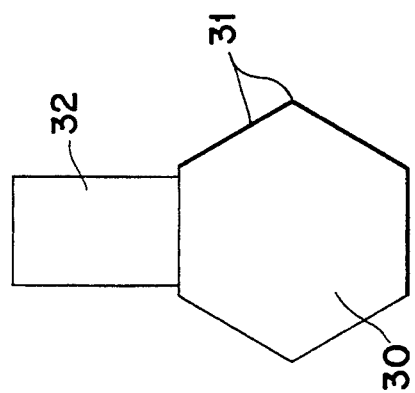
Figure 15:
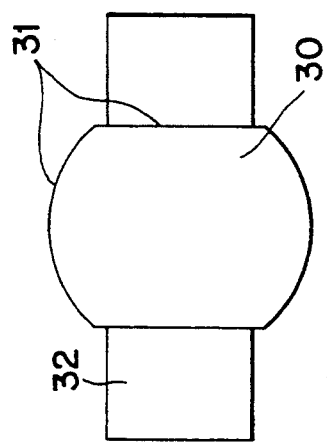
Figure 18:
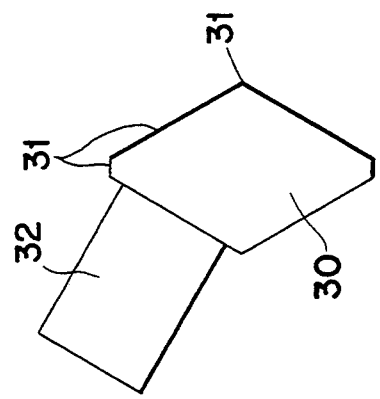
Figure 23:
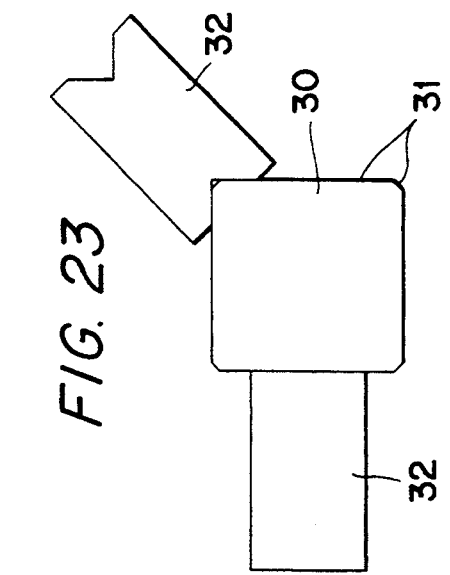
FIGS. 21 to 26 illustrate cross sections through the spindle in which ball races set thereupon, recessed thereinto and planar ball races are combined.
Figure 26:
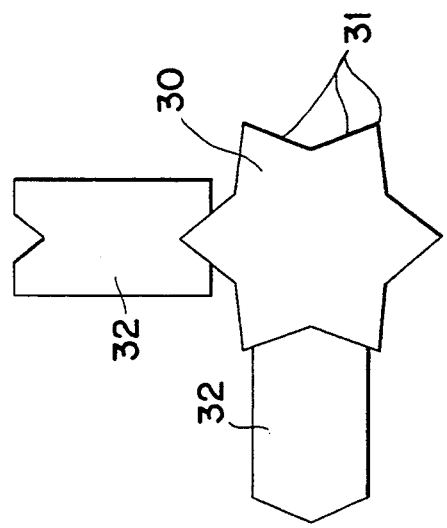
Figure 22:
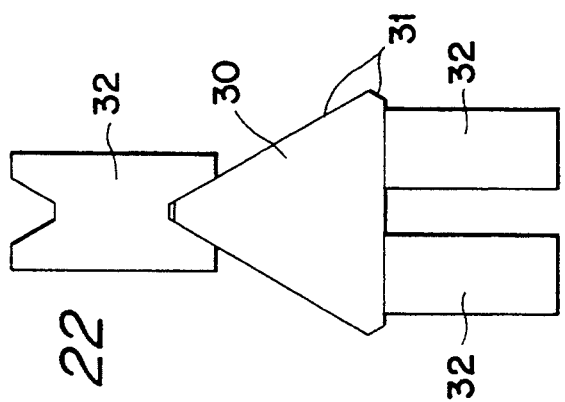
Figure 25:
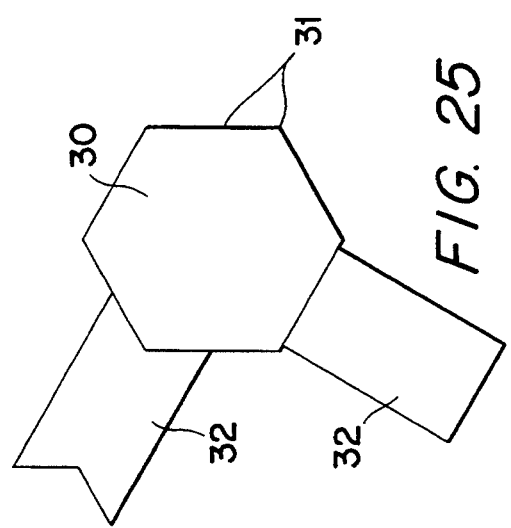
Figure 21:
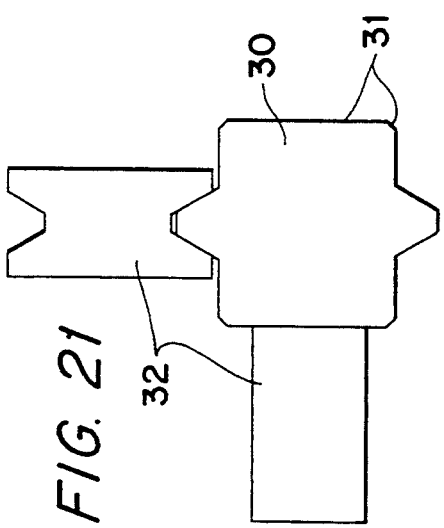
Figure 24:
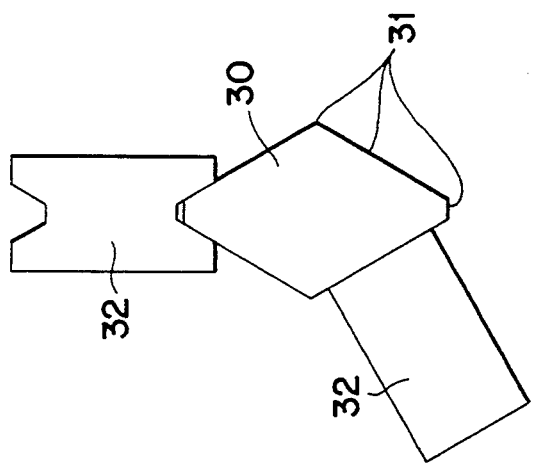

The race member for the circulating balls of the first embodiment of the inventive arm robot apparatus is mounted to the arm 1 and is composed of an inner pan 3 and an outer part 4. The inner part 3 consists preferably of three similar portions as seen in FIG. 3. The inner part 3 and the outer part 4 of the race member for circulating balls 10 are interconnected in such a manner that ball races 9 of a circular cross-section are located between the inner part 3 and the outer part 4. Balls 10 are arranged in the ball races 9 and are adapted to be displaced and moved. The ball races 9 are designed in such a manner that the balls 10 contact the inner part 3 and the outer part 4.

A ball race spindle 5 is located inside the outer race member and extends along the longitudinal axis of the outer race member. The ball race spindle 5 has a mounting block 6 mounted to the first end thereof. The mounting block 6 is mounted to a supporting plate 7. A second end of the ball race spindle includes a plurality of semicircular ball races 8. The ball races 8 can be two to six in number. In the disclosed embodiment, three races 8 are provided.

The inner part 3 of the race member includes pre-tensioning channels 11 in which balls 10 are received for being displaced and moved. The pre-tensioning channels 11 are shaped in such a manner that the balls contact the inner part 3 and the ball race spindle 5. The pre-tensioning channels 11 are interconnected in a sine wave fashion and are arranged alternatingly around the race member. The balls 10 are displaceable and movable through the ball races 8, 9 and through the pre-tensioning channels 11 around the ball race spindle 5.

Engaging members 20 for the balls 10 are located at the transition between the ball races 9 and the pre-tensioning channels 11.

Openings 21 for threaded bolts are also included.

The balls 10 can have a diameter of about 2 millimeters to about 30 millimeters.

Threaded pins 22 are located in the outer part 4 of the race member. By means of these pins mentioned portions of the inner part 3 are pre-tensioned.

The race member for circulating the balls 10 is mounted to a bearing ring 12 which is located between an inner axial bearing 13 and an outer axial bearing 14. Disposed between the inner and outer axial bearings 13, 14 is a radial bearing 15. The bearings 13, 14, 15 are mounted on a driving tube 16 and are pre-tensioned by a nut 17. The driving tube 16 is mounted to a mounting block 18 which in turn is mounted to a movable plate 19. As a result of pushing and pulling forces exerted by the movable plate 19, the race member rotates around the ball race spindle 5.

The amount of degrees about which the arm 1 deflects upon being acted thereupon by pulling and pushing forces depends upon the pitch of the races 8, and their angle relative to the longitudinal axis of the spindle 5.

Normally, the races 8 are inclined in such a manner that a deflection of 180° is obtained over a distance of 300 millimeters.

The race member for the circulating balls is centered by the radial bearing 15 via the bearing ring 12.

The first embodiment of the inventive device is manufactured preferably of a stainless steel, for instance chrome-nickel steel.

In the second embodiment of the inventive arm robot apparatus, features which correspond to features above in connection with the first embodiment will not be described again in detail. In the second embodiment, a plurality of roller bearing race members can be arranged consecutively around the roller spindle as shown in, for example, FIGS. 3 and 4.

In this tandem-arrangement of roller bearing race members the individual roller bearing race members are connected to each other, for instance are screwed together.

The arm 1 of the apparatus is mounted to at least one roller bearing nut 35. Positioned inside the roller bearing nut 35 is a roller spindle 30 which extends in the longitudinal direction of the roller bearing nut 35. The roller spindle 30 is provided with a first end on which is mounted a mounting block 6. The mounting block 6 is mounted on a supporting plate 7. A second end of the roller spindle is provided with a plurality of ball races 31. The ball races 31 can be two to six in number and can be set on, and/or set into, and/or arranged planarly with respect to the roller spindle 30.

The roller spindle 30 contacts supported roller bodies 32 which are mounted in guiding bearings 33 or directly into a housing. The supported roller bodies 32 can take the form of roller bearings. The guiding bearings 33 can be set in bushings or needle roller bearings 40, 41, 42, 43 which are mounted in a housing 34. The guiding bearings are pre-tensioned by a cup spring 36 which is arrested by an arresting ring 37.

A spacer disc 38 can be positioned at two inner sides of the supported roller bodies 32. The supported roller bodies 32 are connected, possibly together with the spacer disc 38, to a peg 39.

As in the first embodiment, the race member (roller bearing nut 35) is mounted to a beating ring 12 which is located between an inner axial bearing 13 and an outer axial bearing 14. Located between the inner axial bearing 13 and the outer axial bearing 14 is a radial bearing 15. The various bearings 13, 14, 15 are mounted on a driving tube 16 and are pre-tensioned by a nut 17. The driving tube 16 is mounted to a mounting block 18 which in turn is mounted to a movable plate 19.

The cross-sectional shape of the ball races 31 in the roller spindle 30 can take various forms such as semi-circular, triangular, quadratic, trapezoidal or square.

The plurality of axial needle bearings can include an axial needle bearing ring 41 disposed between the guiding bearing 33 and the cup spring 36, a needle bearing 42 that supports the supported roller bodies 32 from the inside, and two axial needle bearings 43 that support the supported roller bodies 32 from both sides.

Also, a cover 44 can be positioned between the cup spring 36 and the arresting ring 37. The cover 44 can have a mushroom like cross-section.

The ball races 31 extending around the roller spindle 31 can have one or a plurality of pitches or inclinations. In that way, one or a plurality of predetermined deflections of the arm 1 are possible in response to the pulling or pushing forces exerted by the movable plate 19.

It is to be noted also that in both embodiments of the invention, parts that are mounted to one another can be screwed together.

By various pitches or inclinations, respectively, of the races 31 a variety of deflections of the arm 1 upon the action of corresponding pulling or pushing forces may be obtained.

The races 31 are either planar or set onto the spindle 30 or recessed into the spindle 30, whereby combinations of the planar, set onto and recessed shapes are possible.

The races 31 can have also geometrical shapes other than those illustrated in the drawings.

Normally, the races 31 of the second embodiment of the inventive arm robot apparatus are inclined in such a manner that the pulling and pushing forces over a first distance of 60 millimeters leads to a deflection of the arm 1 of 90°. This can be followed by a curve having a radius of 40 to 120 millimeters in order to deflect the arm 1 still further.

In this position the apparatus into which the inventive arm robot is mounted can be cleaned quite easily.

The races 31 can be inclined in such a manner that the arm 1 is deflected to still a further extent or moves back again.

When passing through the various pitches the guiding bearing 33 must be rotatable by means of the rollers 32 around its own axis.

The planar, set upon or recessed races 31 can be combined.

All present needle roller bearings 40, 41, 42 and 43 increase the stability of the inventive apparatus.

The second embodiment of the inventive apparatus is manufactured preferably of a stainless steel, for instance of chrome-nickel steel.

Both embodiments of the inventive apparatus can be used in applications other than an arm robot apparatus; such as for instance in lifting rotary tables, and for tool changing in machining apparatus.

The operation remains, however, the same in all these applications.

FIGS. 7–10 illustrate other alternative embodiments in which the roller spindle 30 has ball races 31 set thereupon or extending therefrom. Various alternative cross-sectional shapes for the ball races 31 and the supported roller bodies 32 are also illustrated in FIGS. 7–10.

FIGS. 11–14 illustrate other alternative embodiments in which the roller spindle 30 has ball races 31 recessed therein. Various alternative cross-sectional shapes for the ball races 31 and the supported roller bodies 32 are also illustrated.

FIGS. 15–20 illustrate other alternative embodiments in which the roller spindle 30 is provided with planar ball races 31. Various cross-sectional shaped for the roller spindle 30 are also illustrated.

FIGS. 21–26 illustrate still other alternative embodiments involving combinations of ball races 31 set on or extending from the roller spindle 30, ball races 31 recessed in the roller spindle 30, and planar ball races 31. Also illustrated are various combinations of cross-sectional shapes for the roller spindle 30, the ball races 31 and the supporting roller bodies 32.

While there are shown and described present preferred embodiments of the invention, it is to be distinctly understood that the invention is not limited thereto, but may be otherwise variously embodied and practiced within the scope of the following claims.

I claim:

1. An arm robot apparatus for the removal of workpieces, such as injection molded articles, comprising an arm and a gripping device mounted to said arm;

a race member for circulating balls, said race member being mounted to said arm and including an inner part and an outer part;

a ball race spindle located inside of said race member and extending along a longitudinal axis of the race member, said ball race spindle having a first end and a second end;

a first mounting block mounted to the first end of said ball race spindle and to a supporting plate;

said second end of said ball race spindle having at least two semicircular ball races formed thereinto;

said inner part and said outer part of the race member for circulating balls being interconnected in such a manner that ball races of a circular cross-section are located between the inner and outer parts, said ball races having balls arranged therein which are adapted to be displaced and moved;

said ball races being designed in such a manner that the balls contact the inner part and the outer part of the race member;

said inner part of said race member for circulating balls including pre-tensioning channels in which balls are received to be displaced and moved;

said pre-tensioning channels being shaped in such a manner that the balls contact said inner part and said ball race spindle;

said pre-tensioning channels being interconnected in a sine wave fashion and being arranged alternatingly around said race member;

said balls being displaceable and moveable through the ball races and through the pre-tensioning channels around the ball race spindle;

said race member for circulating balls being mounted to a bearing ring;

said bearing ring being located between an inner axial bearing and an outer axial bearing, and a radial bearing located between the inner and outer axial beatings;

said radial bearing and said inner and outer axial bearings being mounted on a driving tube, said inner and outer axial bearings being pre-tensioned by a nut;

said driving tube being mounted to a second mounting block which in turn is mounted to a moveable plate.

2. The arm robot apparatus of claim 1, in which said inner part is comprised of a plurality of sections equal in number to the number of races.

3. The arm robot apparatus of claim 1, in which said inner part is comprised of three sections.

4. The arm robot apparatus of claim 1, wherein the ball races extend around the ball race spindle and wherein pulling and pushing forces exerted by said moveable plate causes said race member to rotate around said spindle.

5. An arm robot apparatus for the removal of workpieces, such as injection molded articles, comprising an arm and a gripping device mounted to said arm;

said arm being mounted to at least one roller bearing nut;

at least two housings, positioned within the roller bearing nut;

a roller spindle located inside said roller bearing nut and extending in a longitudinal direction of the roller bearing nut;

said roller spindle having a first end and a second end, the first end being mounted to a first mounting block;

said first mounting block being mounted to a supporting plate;

said second end of the roller spindle including at least two ball races;

said roller spindle contacting supported roller bodies which are each mounted within one of said housings;

each said supported roller body being mounted on a peg positioned within its respective housing;

said roller bearing nut being mounted to a bearing ring on which an inner axial bearing and an outer axial bearing are located, and including a radial bearing located between said inner and outer axial bearings, said radial bearing and said inner and outer axial bearings being mounted on a driving tube, said inner and outer axial bearings being pre-tensioned by a nut; and said driving tube being mounted to a second mounting block which in turn is mounted to a moveable plate.

6. The arm robot apparatus of claim 5, wherein said ball races have a cross-sectional shape that is one of semi-circular, triangular, quadratic, trapezoidal and square.

7. The arm robot apparatus of claim 5, wherein said supported roller bodies are roller bearings.

8. The arm robot apparatus of claim 5, wherein each of said supported roller bodies is mounted within a guiding bearing that is located in one of the housings and that is pre-tensioned by a respective cup spring, said cup spring being arrested by an arresting ring, and including an axial needle bearing ring located between each guiding bearing and the respective cup spring.

9. The arm robot apparatus of claim 5, wherein the supported roller bodies are supported on an inside by needle bearings disposed between the respective roller body and the peg, said supported roller bodies being supported on opposite sides by axial needle bearings disposed between a respective guiding bearing and the respective roller body.

10. The arm robot apparatus of claim 8, comprising a cover located between said cup spring and said arresting ring, said cover having a mushroom like cross-section.

11. The arm robot apparatus of claim 5, wherein the ball races extending around the roller spindle have one pitch to allow a predetermined deflection of the arm to be made.

12. The arm robot apparatus of claim 5, wherein the ball races extend around the roller spindle and have a plurality of pitches to allow a plurality of predetermined deflections of the arm to be made.

13. The arm robot apparatus of claim 5, wherein the ball races extend around the roller spindle and wherein pulling and pushing forces exerted by said movable plate causes said roller bearing nut to rotate around said spindle.

* * * * *